(12) United States Patent
Kazakevich et al.

(10) Patent No.: US 9,819,926 B2
(45) Date of Patent: Nov. 14, 2017

(54) STEREOSCOPIC (3D) CAMERA SYSTEM UTILIZING A MONOSCOPIC (2D) CONTROL UNIT

(71) Applicant: ConMed Corporation, Utica, NY (US)

(72) Inventors: Yuri Kazakevich, Newton, MA (US); Mark Nelson, Natick, MA (US); Eric Peterson, Auburn, MA (US)

(73) Assignee: ConMed Corporation, Utica, NY (US)

( * ) Notice: Subject to any disclaimer, the term of this patent is extended or adjusted under 35 U.S.C. 154(b) by 151 days.

(21) Appl. No.: 14/554,392

(22) Filed: Nov. 26, 2014

(65) Prior Publication Data

US 2015/0145964 A1    May 28, 2015

Related U.S. Application Data

(60) Provisional application No. 61/909,066, filed on Nov. 26, 2013.

(51) Int. Cl.
| | |
|---|---|
| *H04N 15/00* | (2006.01) |
| *H04N 13/02* | (2006.01) |
| *H04N 13/00* | (2006.01) |
| H04N 13/04 | (2006.01) |

(52) U.S. Cl.
CPC ....... *H04N 13/0239* (2013.01); *H04N 13/004* (2013.01); *H04N 13/0029* (2013.01); *H04N 13/0434* (2013.01)

(58) Field of Classification Search
CPC ........... H04N 13/0239; H04N 13/0029; H04N 13/0434

USPC .......... 348/47, 42, 46, 49, 51; 386/223, 230
See application file for complete search history.

(56) References Cited

U.S. PATENT DOCUMENTS

| | | |
|---|---|---|
| 3,991,266 A | 11/1976 | Baer |
| 5,949,477 A | 9/1999 | Hoglin |
| 6,522,351 B1 | 2/2003 | Park |
| 6,985,168 B2 | 1/2006 | Swift et al. |
| 2003/0133007 A1 | 7/2003 | Iijima et al. |
| 2004/0012851 A1 | 1/2004 | Sato et al. |
| 2012/0105597 A1* | 5/2012 | Tajiri ............... G03B 35/02 348/49 |
| 2013/0102846 A1 | 4/2013 | Sjostrom et al. |

* cited by examiner

Primary Examiner — Robert Chevalier
(74) Attorney, Agent, or Firm — Pandiscio & Pandiscio

(57) ABSTRACT

A camera system comprising:
stereoscopic optics;
a right image sensor for acquiring a right image from the stereoscopic optics and a left image sensor for acquiring a left image from the stereoscopic optics;
a horizontal line switch for receiving the right image from the right image sensor and the left image from the left image sensor and creating a composite image wherein the horizontal line signals from the right image sensor are alternated with the horizontal line signals from the left image sensor; and
a single camera processor for receiving the composite image from the horizontal line switch for presenting to a display.

18 Claims, 4 Drawing Sheets

STEREOSCOPIC (3D) CAMERA SYSTEM UTILIZING A MONOSCOPIC (2D) CONTROL UNIT

REFERENCE TO PENDING PRIOR PATENT APPLICATION

This patent application claims benefit of prior U.S. Provisional Patent Application Ser. No. 61/909,066, filed Nov. 26, 2013 by ConMed Corporation and Yuri Kazakevich et al. for STEREOSCOPIC (3D) CAMERA SYSTEM UTILIZING A MONOSCOPIC (2D) CONTROL UNIT, which patent application is hereby incorporated herein by reference.

FIELD OF THE INVENTION

This invention relates to camera systems in general, and more particularly to stereoscopic (3D) camera systems.

BACKGROUND OF THE INVENTION

Stereoscopic (3D) camera systems are well known in the art.

By way of example but not limitation, ConMed Corporation of Utica, N.Y. manufactures and sells stereoscopic (3D) camera systems which allow surgeons to visualize structures within the body, with the stereoscopic (3D) construction allowing the surgeons to perceive depth.

However, the current state of the art requires a doubling of many components in the stereoscopic (3D) camera system, leading to a higher cost of goods as compared to a monoscopic (2D) camera system.

By way of example but not limitation, FIG. 1 shows a block diagram of the major components in a conventional stereoscopic (3D) camera system 5. Note the duplication of the image sensors (i.e., the right image sensor 10 and the left image sensor 15) and the duplication of the camera processors (i.e., the right camera processor 20 and the left camera processor 25). Note also that the right image sensor 10 and the left image sensor 15 are typically packaged in a 3D camera head 30, and the right camera processor 20 and the left camera processor 25 are typically packaged in a 3D control unit 35. Note also that in the prior art stereoscopic (3D) camera system 5 shown in FIG. 1, the stereoscopic optics 40 (e.g., an endoscope) is mechanically connected to the 3D camera head 30 (e.g., using a mechanical connection 45), the 3D camera head 30 is cable connected to the 3D control unit 35 via cabling 50, and the 3D control unit 35 is cable connected to the multiplexer (MUX) component 55 of the micro-polarization display 60 via cabling 65.

In the prior art stereoscopic (3D) camera system 5 shown in FIG. 1, two identical camera processors (i.e., the right camera processor 20 and the left camera processor 25, contained in the 3D control unit 35) are used to send two complete images to the multiplexer (MUX) component 55 of the micro-polarization display 60 (which then feeds the appropriate signals to the micro-polarization display 60). This type of display uses a micro-polarization technology (also known as XPol® technology), typically implemented as a film or screen located in front of the display pixels, so that the odd lines of pixels are polarized in one sense (e.g., right circular polarization) and the even lines of pixels are polarized in the opposite sense (e.g., left circular polarization). See FIG. 2. When two full resolution right and left image signals are sent to the display (e.g., by the stereoscopic optics 40, the right image sensor 10 and the left image sensor 15 of the 3D camera head 30, and the right camera processor 20 and the left camera processor 25 of the 3D control unit 35), the multiplexer (MUX) component 55 of the micro-polarization display 60 selects the "odd" TV lines from the right camera processor 20 of the 3D control unit 35 and displays them as the "odd" lines of the monitor, and the multiplexer (MUX) component 55 of the micro-polarization display 60 selects the "even" TV lines from the left camera processor 25 of the 3D control unit 35 and displays them as the "even" lines of the monitor. Thus, the TV lines of the display are essentially an interlaced composite of the right image signal from the right camera processor 20 and the left image signal from the left camera processor 25. Viewers wear polarized glasses with right and left circular polarization for the right and left eyes, respectively. Thus, the viewer's right eye will see only the "odd" TV lines of the composite image, corresponding to the right eye image of the object, while the left eye image of the object will be blocked for the viewer's right eye; and, correspondingly, the viewer's left eye will see only the "even" TV lines of the composite image, corresponding to the left eye image of the object, while the right eye image of the object will be blocked for the viewer's left eye. The human brain "fuses" the right and left images and 3D perception occurs as a result.

In view of the foregoing, it will be appreciated that the "even" TV lines information of the right camera processor 20 of the 3D control unit 35, and the "odd" TV lines information of the left camera processor 25 of the 3D control unit 35, is effectively discarded by the multiplexer (MUX) component 55 of the micro-polarization display 60 and is not utilized in the composite video signal displayed to the user.

It is this realization which provides the opportunity to reduce the cost of a stereoscopic (3D) camera system by combining the functionality of two key components into a single key component, i.e., by replacing the right camera processor and the left camera processor of the 3D control unit with a single camera processor (i.e., such as is typically found in a 2D control unit).

SUMMARY OF THE INVENTION

The present invention provides a novel stereoscopic (3D) camera system utilizing a monoscopic (2D) control unit. This construction provides the opportunity to reduce the cost of the stereoscopic (3D) camera system by combining the functionality of two key components into a single key component, i.e., by replacing the right camera processor and the left camera processor of the 3D control unit with a single camera processor such as is typically found in a 2D control unit.

In one preferred form of the invention, there is provided a camera system comprising:

stereoscopic optics;

a right image sensor for acquiring a right image from the stereoscopic optics and a left image sensor for acquiring a left image from the stereoscopic optics;

a horizontal line switch for receiving the right image from the right image sensor and the left image from the left image sensor and creating a composite image wherein the horizontal line signals from the right image sensor are alternated with the horizontal line signals from the left image sensor; and a single camera processor for receiving the composite image from the horizontal line switch for presenting to a display.

In another preferred form of the invention, there is provided a method for providing an image, the method comprising:

providing a camera system comprising:
stereoscopic optics;
a right image sensor for acquiring a right image from the stereoscopic optics and a left image sensor for acquiring a left image from the stereoscopic optics;
a horizontal line switch for receiving the right image from the right image sensor and the left image from the left image sensor and creating a composite image wherein the horizontal line signals from the right image sensor are alternated with the horizontal line signals from the left image sensor; and
a single camera processor for receiving the composite image from the horizontal line switch for presenting to a display;
directing the stereoscopic optics at a field of view;
using the right image sensor to acquire a right image from the stereoscopic optics and the left image sensor to acquire a left image from the stereoscopic optics;
using a horizontal line switch to receive the right image from the right image sensor and the left image from the left image sensor and create a composite image wherein the horizontal line signals from the right image sensor are alternated with the horizontal line signals from the left image sensor; and
presenting the composite image to a display.

In another preferred form of the invention, there is provided a method for providing an image, the method comprising:

providing a camera system comprising:
monoscopic optics;
an image sensor for acquiring an image from the monoscopic optics;
providing apparatus comprising:
stereoscopic optics;
a right image sensor for acquiring a right image from the stereoscopic optics and a left image sensor for acquiring a left image from the stereoscopic optics;
a horizontal line switch for receiving the right image from the right image sensor and the left image from the left image sensor and creating a composite image wherein the horizontal line signals from the right image sensor are alternated with the horizontal line signals from the left image sensor; and
a single camera processor for receiving the composite image from the horizontal line switch and presenting the composite image to a display;
replacing the monoscopic optics with the stereoscopic optics, and replacing the image sensor with the right image sensor, the left image sensor and the horizontal line switch;
directing the stereoscopic optics at a field of view;
using the right image sensor to acquire a right image from the stereoscopic optics and the left image sensor to acquire a left image from the stereoscopic optics;
using a horizontal line switch to receive the right image from the right image sensor and the left image from the left image sensor and create a composite image wherein the horizontal line signals from the right image sensor are alternated with the horizontal line signals from the left image sensor; and
presenting the composite image to a display.

In another preferred form of the invention, there is provided apparatus comprising:
a 2D control unit comprising a single camera processor; and
a horizontal line switch downstream from a camera head and upstream of the single camera processor.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Figure 1:
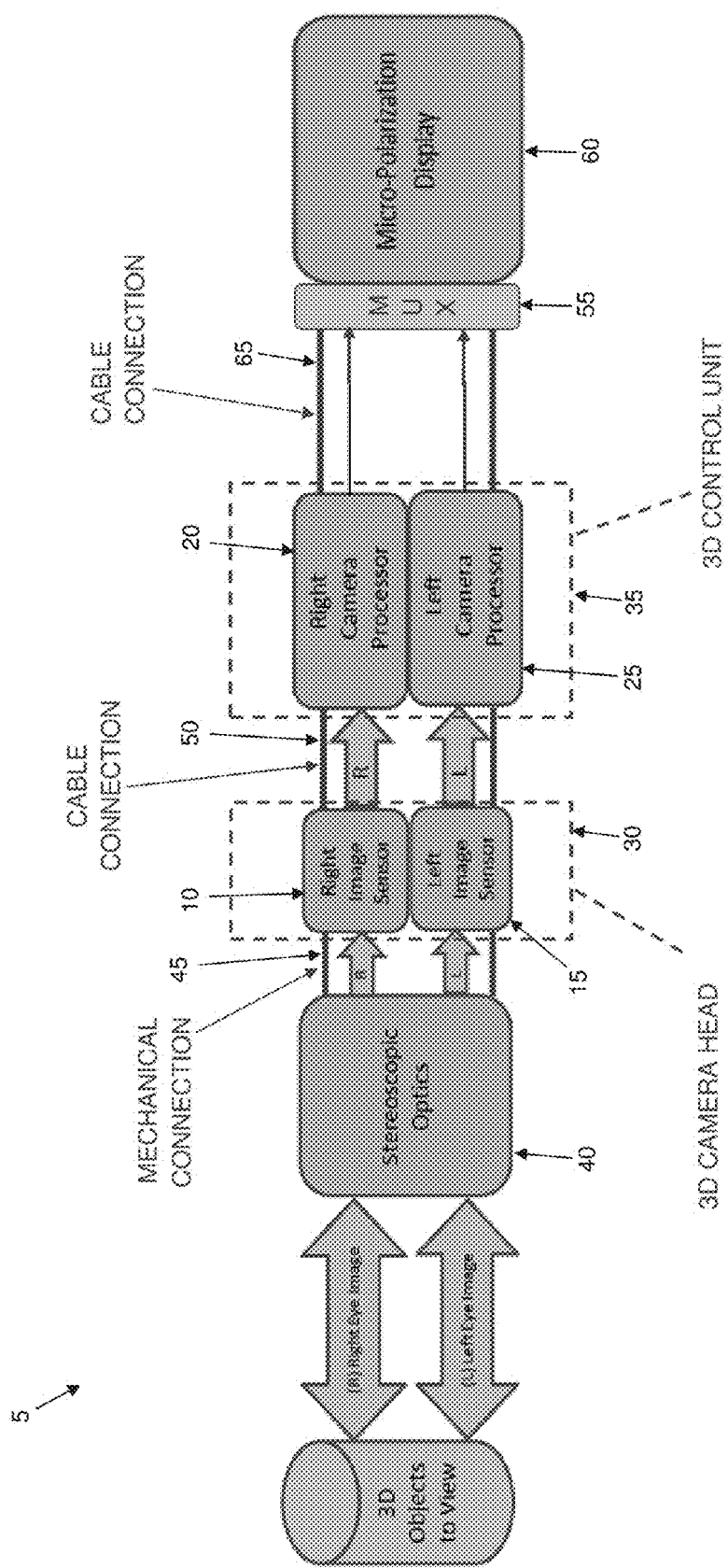
FIG. 1 is a schematic view showing the major components in a conventional stereoscopic (3D) camera system.
Figure 2:
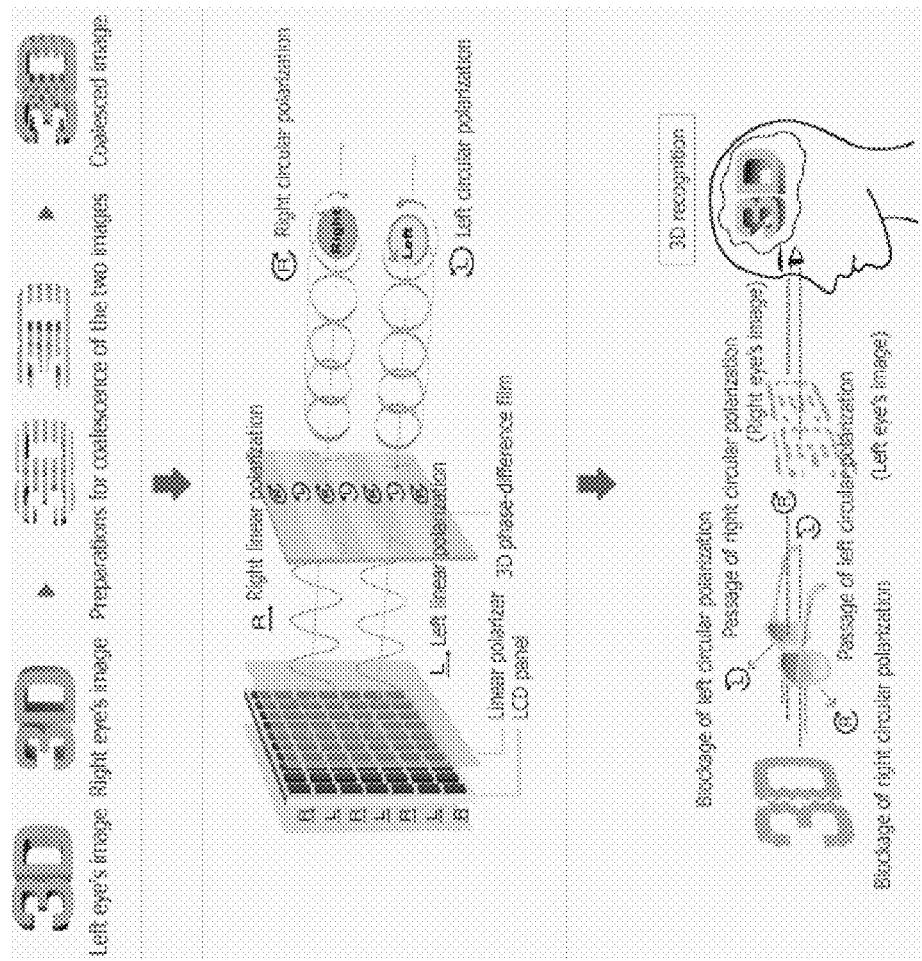
FIG. 2 is a schematic view showing how micro-polarization technology is used to provide a right camera image to the right eye of a viewer and a left camera image to the left eye of a viewer.
Figure 3:
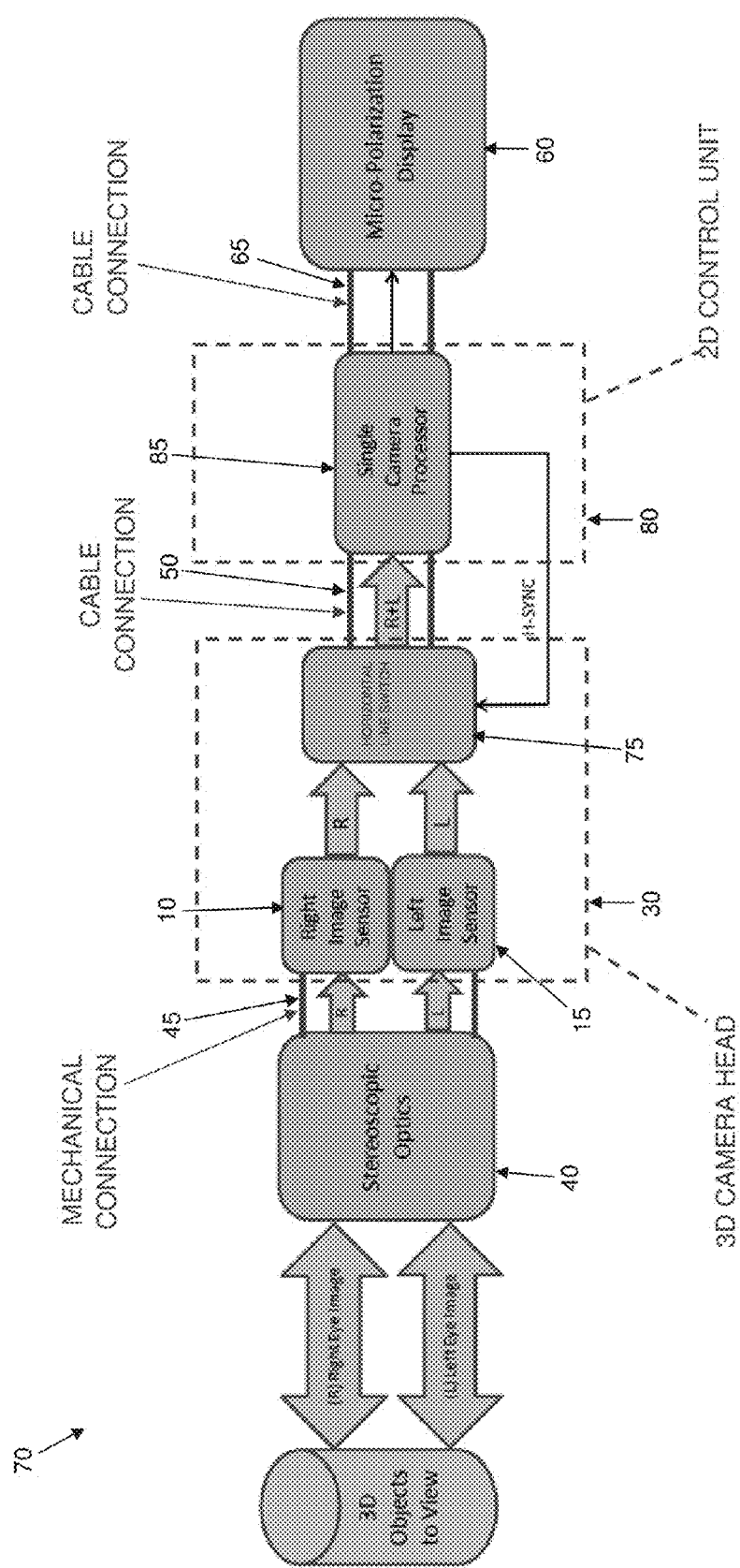
FIG. 3 is a schematic view showing a novel stereoscopic (3D) camera system formed in accordance with the present invention.

Looking now at FIG. 3, there is shown a block diagram of the major components of a novel stereoscopic (3D) camera system 70. This new system adds a horizontal line switch 75 (preferably packaged in the 3D camera head 30), but also eliminates one camera processor, in order to more efficiently generate the composite image displayed on the micro-polarization display 60. In addition, the new stereoscopic (3D) camera system 70 also eliminates the multiplexer (MUX) component 55 of the conventional stereoscopic (3D) system 5 (FIG. 1), which is frequently an expensive add-on component to the micro-polarization display 60. In essence, and as will hereinafter be discussed, the present invention comprises a stereoscopic (3D) camera system utilizing a monoscopic (2D) control unit 80, enabled by the provision of a horizontal line switch 75 between the right image sensor 10 and left image sensor 15 of the 3D camera head 30 and the single camera processor 85 of the 2D control unit 80.

More particularly, in the present invention, the right image sensor 10 and the left image sensor 15 of the 3D camera head 30 are connected to the single camera processor 85 of 2D control unit 80 through the horizontal line switch 75. The horizontal line switch 75 is synchronized with the horizontal sync circuitry of the single camera processor 85 and appropriately switches the horizontal line video signals supplied to the single camera processor 85 by the right image sensor 10 and the left image sensor 15, respectively. Thus, with the present invention, the single camera processor 85 receives the first horizontal line signal from the right image sensor 10 of the 3D camera head 30, the second horizontal line signal from the left image sensor 15 of the 3D camera head 30, and so on, whereby to compile the full camera image (i.e., as an interlaced composite of the outputs of the right image sensor 10 and left image sensor 15). This switching is done within the horizontal blanking period so that there is no loss of video signal.

By utilizing this technique, the single camera processor 85 receives signals from two different image sensors (i.e., the right image sensor 10 of the 3D camera head 30 and the left image sensor 15 of the 3D camera head 30), with the signals being appropriately selected upstream of the single camera processor 85 (i.e., by the horizontal line switch 75), so that the single camera processor 85 can compile the full composite image while functioning in exactly the same manner as a conventional monoscopic (2D) camera processor. As a result, a standard 2D camera processor (i.e., the 2D control unit 80) can be utilized in the stereoscopic (3D) camera system 70 shown in FIG. 3. The complexity and cost of the horizontal line switch 75 is considerably less than the cost of a second camera processor (i.e., the cost of a 2D control unit 80 is considerably less than the cost of a 3D control unit 35), thereby leading to significant cost savings. In addition, the present invention also eliminates the multiplexer (MUX) component 55 of the conventional stereoscopic (3D) system 5 of FIG. 1, which is frequently an expensive add-on component to the micro-polarization display 60.

It will be appreciated that the advantages of the new stereoscopic (3D) camera system 70 include reduced system cost, reduced system complexity and reduced system size.

It should also be appreciated that, in one preferred form of the present invention, the stereoscopic optics 40 (e.g., an endoscope) is mechanically connected to the 3D camera head 30 (e.g., using a mechanical connection 45), the 3D camera head 30 is cable connected to the 2D control unit 80 via cabling 50, and the 2D control unit 80 is cable connected to the micro-polarization display 60 via cabling 65.

In addition, the advantages of the new system include modularity between 3D and 2D camera systems.

By way of example but not limitation, suppose a user is currently using a monoscopic (2D) camera system and they wish to use a stereoscopic (3D) camera system. In this case, with the present invention, the user simply switches out the monoscopic optics and 2D camera head, and switches in the stereoscopic optics 40 and 3D camera head 30 (which includes the horizontal line switch 75), in order to provide the 3D stereoscopic system of the present invention (see FIG. 3).

By way of further example but not limitation, suppose a user is currently using the 3D stereoscopic system 70 of the present invention (see FIG. 3) and they wish to use a monoscopic (2D) camera system. In this case, with the present invention, the user simply switches out the stereoscopic optics 40 and 3D camera head 30 (which includes the horizontal line switch 75), and switches in the 2D optics and 2D camera head, in order to provide a monoscopic (2D) camera system.

Figure 4:
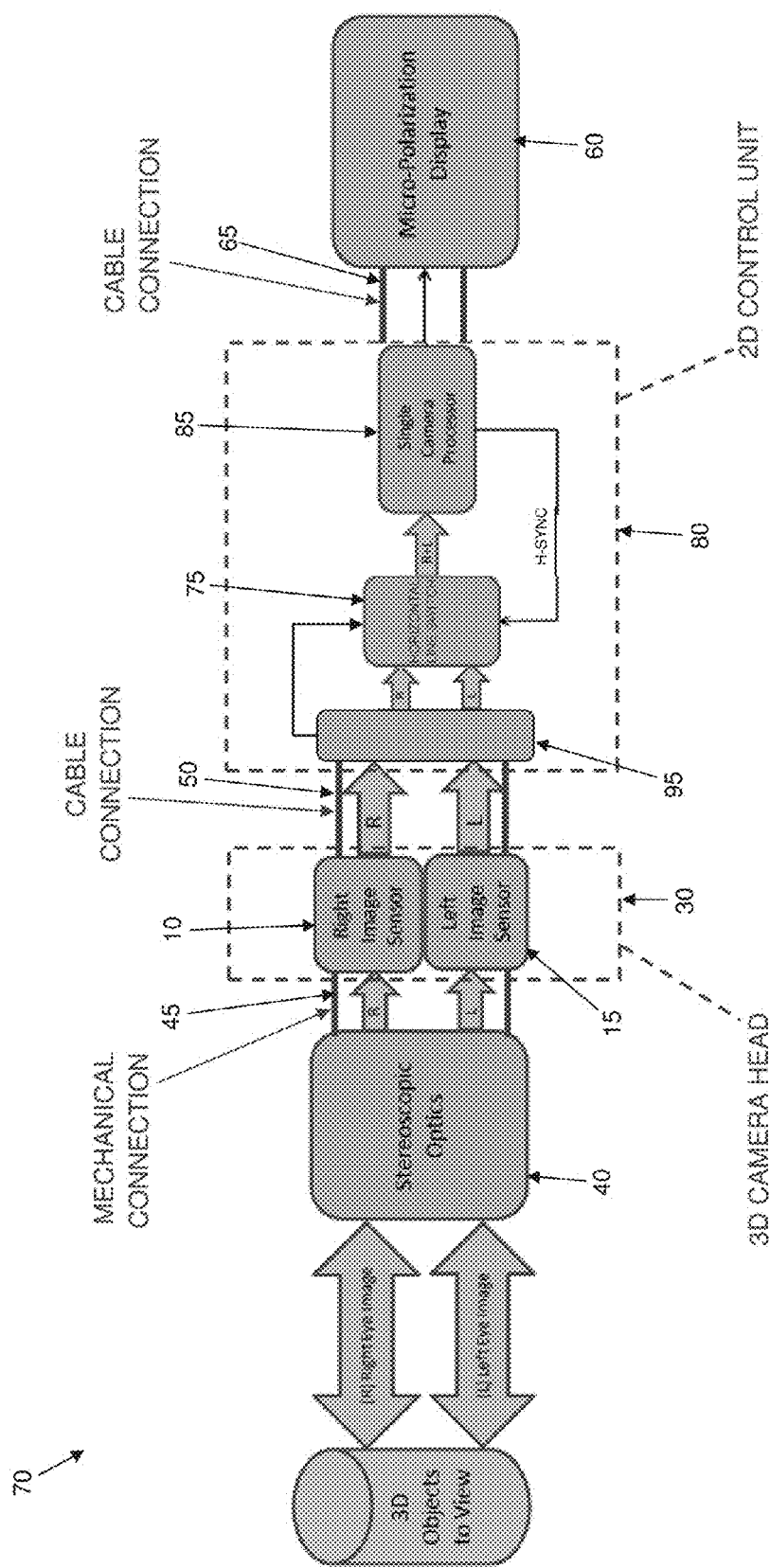
FIG. 4 is a schematic view showing another novel stereoscopic (3D) camera system formed in accordance with the present invention.

In the foregoing description of the invention, the horizontal line switch 75 is packaged with the 3D camera head 30, e.g., in the manner shown in FIG. 3. However, if desired, the horizontal line switch 75 may be packaged with the 2D control unit 80, such as is shown in FIG. 4. However, in this form of the invention, where a user is currently using the 3D stereoscopic system and they wish to use a monoscopic (2D) camera system, in addition to switching out the stereoscopic optics 40 and 3D camera head 30 and switching in the 2D optics and 2D camera head, the user must also turn off the horizontal line switch 75 in order to provide a monoscopic (2D) camera system. To this end, where horizontal line switch 75 is packaged with 2D control unit 80, it can be desirable to provide a detector/control unit 95 upstream of horizontal line switch 75, wherein detector/control unit 95 is configured to (i) detect whether the 2D control unit 80 is receiving a stereoscopic video signal or a monoscopic video signal, (ii) activate (i.e., turn on) horizontal line switch 75 where the 2D control unit 80 is receiving a stereoscopic video signal, and (iii) deactivate (i.e., turn off) horizontal line switch 75 where the 2D control unit 80 is receiving a monoscopic video signal. The construction and operation of detector/control unit 95 will be apparent to those skilled in the art in view of the present disclosure.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A camera system comprising:
   stereoscopic optics;
   a right image sensor for acquiring a right image from the stereoscopic optics and a left image sensor for acquiring a left image from the stereoscopic optics;
   a horizontal line switch for receiving the right image from the right image sensor and the left image from the left image sensor and creating a composite image wherein the horizontal line signals from the right image sensor are alternated with the horizontal line signals from the left image sensor; and
   a single camera processor for receiving the composite image from the horizontal line switch for presenting to a display.

2. A camera system according to claim 1 wherein the horizontal line switch is synchronized with the horizontal sync circuitry of the single camera processor so as to appropriately switch the horizontal line video signals supplied to the single camera processor by the right image sensor and the left image sensor, respectively.

3. A camera system according to claim 1 wherein the right image sensor and left image sensor are packaged in a 3D camera head, the single camera processor is packaged in a 2D control unit, and the horizontal line switch is packaged in the 3D camera head.

4. A camera system according to claim 3 wherein the stereoscopic optics are mechanically connectable to the 3D camera head, the 3D camera head is cable connectable to the 2D control unit, and the 2D control unit is cable connectable to the micro-polarization display.

5. A camera system according to claim 1 wherein the right image sensor and left image sensor are packaged in a 3D camera head, the single camera processor is packaged in a 2D control unit, and the horizontal line switch is packaged in the 2D control unit.

6. A camera system according to claim 5 wherein the 2D control unit comprises a detector/control unit upstream of the horizontal line switch, and further wherein the detector/control unit is configured to (i) detect whether the 2D control unit is receiving a stereoscopic video signal or a monoscopic video signal, (ii) activate the horizontal line switch where the 2D control unit is receiving a stereoscopic video signal, and (iii) deactivate the horizontal line switch where the 2D control unit is receiving a monoscopic video signal.

7. A camera system according to claim 5 wherein the stereoscopic optics are mechanically connectable to the 3D camera head, the 3D camera head is cable connectable to the 2D control unit, and the 2D control unit is cable connectable to the micro-polarization display.

8. A camera system according to claim 1 further comprising a micropolarization display connected to the 2D control unit.

9. A method for providing an image, the method comprising:

providing a camera system comprising:
   stereoscopic optics;
   a right image sensor for acquiring a right image from the stereoscopic optics and a left image sensor for acquiring a left image from the stereoscopic optics;
   a horizontal line switch for receiving the right image from the right image sensor and the left image from the left image sensor and creating a composite image wherein the horizontal line signals from the right image sensor are alternated with the horizontal line signals from the left image sensor; and
   a single camera processor for receiving the composite image from the horizontal line switch for presenting to a display;
directing the stereoscopic optics at a field of view;
using the right image sensor to acquire a right image from the stereoscopic optics and the left image sensor to acquire a left image from the stereoscopic optics;
using a horizontal line switch to receive the right image from the right image sensor and the left image from the left image sensor and create a composite image wherein the horizontal line signals from the right image sensor are alternated with the horizontal line signals from the left image sensor; and
presenting the composite image to a display.

10. A method according to claim 9 wherein the horizontal line switch is synchronized with the horizontal sync circuitry of the single camera processor so as to appropriately switch the horizontal line video signals supplied to the single camera processor by the right image sensor and the left image sensor, respectively.

11. A method according to claim 9 wherein the right image sensor and left image sensor are packaged in a 3D camera head, the single camera processor is packaged in a 2D control unit, and the horizontal line switch is packaged in the 3D camera head.

12. A method according to claim 11 wherein the stereoscopic optics are mechanically connectable to the 3D camera head, the 3D camera head is cable connectable to the 2D control unit, and the 2D control unit is cable connectable to the micro-polarization display.

13. A method according to claim 9 wherein the right image sensor and left image sensor are packaged in a 3D camera head, the single camera processor is packaged in a 2D control unit, and the horizontal line switch is packaged in the 2D control unit.

14. A method according to claim 13 wherein the 2D control unit comprises a detector/control unit upstream of the horizontal line switch, and further wherein the detector/control unit is configured to (i) detect whether the 2D control unit is receiving a stereoscopic video signal or a monoscopic video signal, (ii) activate the horizontal line switch where the 2D control unit is receiving a stereoscopic video signal, and (iii) deactivate the horizontal line switch where the 2D control unit is receiving a monoscopic video signal.

15. A method according to claim 13 wherein the stereoscopic optics are mechanically connectable to the 3D camera head, the 3D camera head is cable connectable to the 2D control unit, and the 2D control unit is cable connectable to the micro-polarization display.

16. A method according to claim 9 wherein the camera system further comprises a micro-polarization display connected to the 2D control unit.

17. A method according to claim 9 further comprising the steps of replacing the stereoscopic optics, the right image sensor, the left image sensor and the horizontal line switch with monoscopic optics and an image sensor.

18. A method for providing an image, the method comprising:
providing a camera system comprising:
   monoscopic optics;
   an image sensor for acquiring an image from the monoscopic optics;
providing apparatus comprising:
   stereoscopic optics;
   a right image sensor for acquiring a right image from the stereoscopic optics and a left image sensor for acquiring a left image from the stereoscopic optics;
   a horizontal line switch for receiving the right image from the right image sensor and the left image from the left image sensor and creating a composite image wherein the horizontal line signals from the right image sensor are alternated with the horizontal line signals from the left image sensor; and
   a single camera processor for receiving the composite image from the horizontal line switch and presenting the composite image to a display;
replacing the monoscopic optics with the stereoscopic optics, and replacing the image sensor with the right image sensor, the left image sensor and the horizontal line switch;
directing the stereoscopic optics at a field of view;
using the right image sensor to acquire a right image from the stereoscopic optics and the left image sensor to acquire a left image from the stereoscopic optics;
using a horizontal line switch to receive the right image from the right image sensor and the left image from the left image sensor and create a composite image wherein the horizontal line signals from the right image sensor are alternated with the horizontal line signals from the left image sensor; and
presenting the composite image to a display.

* * * * *